United States Patent [19]

Fabris et al.

[11] 3,980,594

[45] Sept. 14, 1976

[54] TRIMERIZATION OF AROMATIC ISOCYANATES CATALYZED BY CERTAIN AMMONIUM SALTS

[75] Inventors: Hubert J. Fabris, Akron; Edwin M. Maxey, Kent; Heinz Uelzmann, Tallmadge, all of Ohio

[73] Assignee: The General Tire & Rubber Company, Akron, Ohio

[22] Filed: Apr. 23, 1975

[21] Appl. No.: 570,680

[52] U.S. Cl............... 260/2.5 AC; 260/2.5 AW;
  260/77.5 AC; 260/77.5 NC; 260/248 NS;
  260/567.6 M; 428/425
[51] Int. Cl.².......................................... C08G 18/00
[58] Field of Search.............. 260/77.5 NC, 2.5 AW, 260/248 NS, 77.5 AC, 2.5 AC

[56] References Cited
UNITED STATES PATENTS

| | | | |
|---|---|---|---|
| 2,866,802 | 12/1958 | Graham | 260/248 NS |
| 3,487,080 | 12/1969 | Matsui et al. | 260/248 NS |
| 3,657,161 | 4/1972 | Bernard et al. | 260/77.5 NC |
| 3,711,444 | 1/1973 | Allen et al. | 260/77.5 NC |
| 3,715,337 | 2/1973 | Allen et al. | 260/77.5 NC |
| 3,817,939 | 6/1974 | Allen et al. | 260/77.5 NC |

*Primary Examiner*—M. J. Welsh

[57] ABSTRACT

Quaternary ammonium salts or inorganic and organic oxygen acids having pK values (where pK is the negative log of the dissociation constant) for at least one of the dissociable hydrogen atoms equal to or greater than 2.0 in aqueous solution are employed as extremely efficient catalysts for trimerization of organic isocyanates, particularly aromatic isocyanates, to isocyanurates and for urethane formation.

8 Claims, No Drawings

TRIMERIZATION OF AROMATIC ISOCYANATES CATALYZED BY CERTAIN AMMONIUM SALTS

BACKGROUND OF THE INVENTION

Isocyanurates are prepared by cyclic trimerization of isocyanates. These products have excellent thermal stability and superior flame resistance and are, therefore, desirable structural units for thermally resistant plastic materials. One of the advantages of the isocyanurates is that they retain their strengths to temperatures of 160°C. or more and are resistant to most organic solvents, acids, alkali, ultraviolet light and humidity. The isocyanurates can be employed as solvent-free systems, and the curing conditions can be varied over a wide range of times and temperature from rapid cure at room temperature to curing at elevated temperatures up to about 160°C. while maintaining satisfactory pot life. The isocyanurates can be modified with other polymers such as polyether polyols, epoxy resins, acrylic resins and alkyd resins or they can be extended with fillers, pigments and the like.

Heretofore, a variety of catalysts has been used to promote trimerization, including quaternary hydroxides of nitrogen, phosphorus, arsenic and antimony (British Patent No. 837,120); tertiary amines, alkali or alkaline earth metal salts of 1–3 carbon carboxylic acids, alkali metal alkoxides and organic tertiary phosphines (U.S. Pat. No. 3,211,703); special tertiary amines such as N,N',N''-tris(dimethylaminopropyl) hexahydrotriazine (U.S. Pat. No. 2,993,870), and 2,4,6-tris(dimethylaminomethyl) phenol (U.S. Pat. No. 3,222,303); certain epoxide-tertiary amine mixtures (U.S. Pat. No. 2,979,485); and heavy metal compounds, such as iron acetylacetonate, which are soluble in organic solvents (U.S. Pat. No. 3,135,111).

some of these catalysts are relatively inactive at room temperature, and heat and/or excessively high levels of catalyst are required. Others are such strong bases that their presence in the final product has a detrimental effect upon the aging properties of said product, especially in the presence of chemical groups that are sensitive to nucleophilic attack. Therefore, there is still a need for new catalysts for cyclic trimerization of isocyanates which do not have these inherent disadvantages.

SUMMARY OF THE INVENTION

This invention comprises the use of quaternary ammonium salts of weak acids having pK values of at least 2.0 in aqueous solution at room temperature as catalysts for the formation of isocyanurates from aromatic isocyanates, preferably unhindered isocyanates, as well as for the urethane reaction, and the unique products produced thereby.

More specifically, this invention comprises principally the use of compounds of the formula $(NR_4)_yA$ as isocyanurate-forming and urethane-forming catalysts wherein each R can be any organic group other than A free of any substituents (including functional groups) which react with isocyanates under conditions of trimerization, no more than one R per N containing an aromatic ring attached directly to N; A can be any anion derived from an acid, primarily an inorganic oxygen acid or a carboxylic acid free of active hydrogen atoms or other substituents which can react with isocyanates under conditions of trimerization, said acid having a pK value in aqueous solution at essentially room temperature of at least 2, preferably at least about 4 and no greater than about 10, and y is a whole number (at least 1) equal in value to the valence of A. Examples of suitable acids from which A can be derived appear in the lists on pages D-77 and D-78 of the The Handbook of Chemistry and Physics. 45th Edition (1964–1965), The Chemical Rubber Co., Cleveland, Ohio.

Each R is preferably a hydrocarbon group such as, for example, an alkyl, cycloalkyl, alkenyl, cycloalkenyl, aryl, aralkyl or alkaryl group, preferably containing no more than about 18 carbon atoms, more preferably no more than about 8 carbon atoms. However, possible additional substituents in the R groups include halogen atoms, ether oxygen atoms, ester groups, tertiary amine groups, amide groups, urethane groups, urea groups and the like. The R groups on any N can be the same or different, and the total number of carbon atoms in the R groups on any N atom is preferably no greater than about 25, more preferably no greater than about 12.

The above-defined compounds can be used as catalysts in the formation of urethanes and/or the formation of isocyanurates in amounts of from 0.01 to 2 percent or more by weight based on the weight of the isocyanates employed. Because the efficiency of a catalyst is directly influenced by its compatability in a particular reaction system, the $(NR_4)_yA$ compounds should be chosen as to give optimum compatibility in the particular reaction system.

DESCRIPTION OF THE PREFERRED EMBODIMENT

The catalysts employed in this invention provide optimum process control at low catalyst concentrations and do not impair aging characteristics while making possible strongly exothermic, fast reactions at ambient temperatures. These accomplishments are two of the principal general objects of this invention. The characteristics of the subject catalysts are such that the isocyanurate-forming and urethaneforming or urea-forming reactions can be readily modified to yield a wide variety of products. For example, trimerization of diphenyl-methane-4,4'-diisocyanate, generally identified as MDI and MDI-based polymeric isocyanates in the presence of small amounts of water and/or an auxiliary blowing agent give rigid cellular products. Brittle resins in cellular or noncellular form, such as those obtained by trimerization of polymeric MDI, can be made less brittle without significantly decreasing temperature stability by incorporating into a formulation from 20 to 60 parts by weight of aliphatic polyethers, aliphatic polyesters or polyepoxides (number average molecular weight of 250 to 12,000, preferably 500 to 6000) per 100 parts of isocyanate. The catalyst compounds described herein are also excellent urethane-forming catalysts and in this respect are at least comparable to stannous octoate. If any of the R or A groups carriers a function such as a tertiary amine, new catalysts for flexible urethane foams are produced.

The efficiency of the subject catalysts can be altered by the addition, for example, of aromatic primary polyamines such as phenylene diamine or diamino toluene. These additives delay the activity of the catalyst giving a corresponding increase in "cream time" for rigid isocyanurate foams.

It has also been found that alcohols and polyols containing principally secondary and tertiary hydroxyl groups inhibit trimerization apparently until the hydroxyl groups have been substantially eliminated by the formation of urethanes even though the isocyanate-hydroxyl reaction normally proceeds at a considerably slower rate than trimerization. This apparent catalytic selectivity makes it possible to increase the pot life or cream time of the isocyanate reaction mixture without affecting the cure time, total set-up time being extended only by the increase in cream and rise times. The total concentration of secondary and/or tertiary alcohol groups should be in the range of from about 0.01 to 0.25 OH group per NCO group if the OH containing compound is a monoalcohol or from about 0.01 to 0.50 OH group per isocyanate group if the OH compound has 2 or more hydroxyl groups. Thus, any secondary and tertiary hydroxyl groups in the other components in the total system must be taken into account, such as any secondary (or tertiary) hydroxyl group in the aliphatic polyethers, polyesters or epoxides previously referred to.

The preferred sources of secondary and tertiary hydroxyl groups are secondary alcohols of 3 to 10, preferably 3 to 5, carbon atoms, tertiary alcohols of 4 to 5 carbon atoms and polymeric polyols, preferably polyether polyols, of the types described herein and having molecular weights no higher than about 12,000, preferably no higher than about 6000. Simple alcohols are preferred because they are easier to handle and because they do not produce network links. Suitable alcohols include isopropanol, sec-butanol, tert-butanol, 2-methyl-2-butanol, 2-pentanol, 3-pentanol, 2,3-dimethyl-3-pentanol, 3-ethyl-3-pentanol, 2-hexanol, 3-hexanol, 2-methyl-2-hexanol, 5-methyl-2-hexanol, 3-methyl-3-hexanol, 2-heptanol, 3-heptanol, 4-heptanol, 2-octanol, 2-methyl-2-octanol and tricyclo[$5.2.1.0^{2,6}$]-dec-3-en-8(9)-ol and mixtures thereof.

The quaternary ammonium salts of this invention are generally prepared by standard techniques well known in the art. One method involves alkylation of tertiary amines, conversion to the hydroxide or alkoxide and reaction of the hydroxide or alkoxide with a selected acid to form the desired salt, usually in alcohol solution. Examples of typical compounds include tetramethyl ammonium octoate; tetramethyl ammonium 2-ethyl hexoate; tetramethyl ammonium carbonate; tetramethyl ammonium chloroacetate, and bis (trimethyl benzyl ammonium) maleate.

Of special interest are quaternary ammonium carbonates such as tetramethyl ammonium carbonate. This highly active trimerization catalyst additionally reacts with acids inherent in the separate ingredients, such as in the polyisocyanate, and with other acids having pK values less than 6 purposely added to the formulation to produce a source of carbon dioxide for additional blowing in a foam while neutralizing the system. When the acids are weak acids, i.e., acids having ionization pK's or 2 or more, the resulting salt formed therefrom is at least equally effective as a catalyst as is the carbonate. Thus, addition of small amounts of weak acids to formulations employing a quaternary carbonate as the catalyst does not significantly affect the reactivity of the system while giving foams of lower density.

The isocyanates and polyisocyanates suitable for use with these novel compounds to form isocyanurate products are preferably unhindered aromatic isocyanates having more than one active isocyanate group per molecule. Examples of these include 1,5-naphthalenediisocyanate, 4,4'-diisocyanatodiphenylether, benzidinediisocyanate, 9,10-anthracenediisocyanate, 4,4'-diisocyanatodibenzyl, 4,4'-diisocyanatostilbene, and 1,8-naphthalenediisocyanate. It is to be understood that mixtures of two or more of these polyisocyanates may be employed. preferred among the polyisocyanates is 4,4'-diisocyanatodiphenylmethane, popularly known as "MDI," and the polyisocyanates obtained by phosgenation of crude condensation products of aniline with formaldehyde.

The catalyst of this invention may be mixed with the aforedescribed polyisocyanates at levels of from 0.01 to 2 parts by weight per 100 parts by weight of the isocyanates. Where these catalysts are chosen to be miscible or soluble in the isocyanate, the polymerization reaction proceeds significantly faster than if the catalyst is not homogeneous with the isocyanate. The homogeneity of the catalyst and the isocyanate is controlled greatly by the R substituents on the nitrogen N as well as the structure of the anion.

Additives may be employed to produce products with different properties using the same catalysts of this invention. For instance, polyisocyanates alone or in admixture with polyether polyols, polyester polyols or epoxy resins and/or with small amounts of water can be reacted in the presence of the catalysts of this invention to produce a wide variety of products. Employing polyols reduces brittleness of trimerized polyisocyanates. Adding small amounts of water causes formation of foams. Of the polyols suitable for use herein, polyether diols, triols, and tetrols are preferred.

Preferred polyethers are the polyalkylene ether polyols prepared by adding propylene oxide to various diol, triol, tetrol and other polyol starters to produce adducts of various molecular weights. Polyethers which deserve special mention are the 1,2,6-hexanetriol and glycerol adducts of propylene oxide having molecular weights of from about 250 to 6000.

Generally, the polyethers preferred for employment in this invention can be conveniently characterized as liquid polyethers having viscosities in the range of from 50 centipoises to about 50,000 centipoises at room temperature (i.e., 25°C.) and having molecular weights in the range of from 1000 to about 6000.

When water is used to form a cellular product, the water should be used in levels of 0.5 to 5 parts by weight per 100 parts by weight of polyisocyanate. Other gas-producing materials can be utilized either alone or in conjunction with water such as volatile halogenated (preferably fluorinated) hydrocarbons.

Where no water or other pneumatogen is employed and the isocyanate is modified by addition of a polyether polyol such as a polyether triol, the catalysts of this invention produce isocyanurate coatings and adhesives that display exceptional bond strength to such diverse adherends as fiber-reinforced polyester sheets, metal surfaces and rubber surfaces. These adhesives retain their strength to temperatures of 160°C. or more. In addition, they can be applied as solvent-less systems, and the cure rate of the isocyanurate can be adjusted over a wide range of temperatures and times from rapid set-up at room temperature to slow cure at elevated temperatures. They can also be readily applied as a two-component system with spray guns such as for use in spraying rigid urethane foam insulation.

These coatings and adhesives are preferably prepared from the aforementioned polyisocyanates, the catalysts of this invention and polyether polyols. Generally, such polyols are employed in amounts ranging from 20 to 60, preferably around 40, parts by weight per 100 parts by weight of the polyisocyanate, and the catalyst is employed at levels ranging from 0.25 to 1.25 parts by weight on the same basis. Modifications can be attained by the inclusion of fillers, pigments and other extender materials.

When the catalysts of this invention are combined with aromatic primary polyamines such as diaminobenzene and diaminotoluene in isocyanurate foam systems, two significant effects are produced. The first is a marked increase in time for the start of fast exotherm at a given catalyst concentration as compared to a similar formulation not containing the polyamine. See, e.g., Example VI below. This delay in time may vary from one to twelve times the normal time for start of the exotherm. For example, where a time of 1.4 minutes is experienced when 1.5 parts of tetramethyl ammonium octoate are blended with 100 parts of polymeric isocyanate, the addition of an equal molar amount of toluene diamine increases the lapse time to about 11.8 minutes. For production control it is very desirable to be able to control this time to compatibilize the formulation with various equipment and process requirements.

The second effect observed when aromatic polyamines are added to the formulation is a very marked increase in initial viscosity of the formulation.

The increase in viscosity at the onset of foaming produces a greatly improved and more highly stabilized cellular structure and results in improved reverse impact strengths in the final product without loss of other properties such as surface hardness of molded integral skin rigid foam parts.

A further embodiment is the use of the catalysts of this invention for trimerization of polyisocyanates in combination with a catalyst for the promotion of carbodiimide formation. The product resulting from the reactions is a rigid foam having excellent dimensional stability at elevated temperatures and low friability. By controlling the relative amounts of the two catalysts, the physical density and chemical crosslink density of the foam can be altered.

Any of the known catalysts for carbodiimide formation can be used in this embodiment such as, for example, the phosphorus catalysts described in U.S. Pat. Nos. 2,853,473 and 2,853,518. A catalyst that has been found to be exceptionally compatible with the trimerization catalysts of this invention is 1-phenyl-3-methyl-3-phospholene-1-oxide. Typical levels of carbodiimide-forming catalyst used in this embodiment are 2 to 4 parts by weight per 100 parts by weight of isocyanate and 1 to 3 times the weight of the trimerization catalysts of this invention.

The quaternary ammonium salts of weak acids of this invention are extremely effective catalysts for urethane formation comparable to, and in some cases, surpassing the efficiency of stannous octoate. When employing the catalysts of this invention in the preparation of flexible foams, products with improved resilience are obtained.

By these means a wide range of catalysts with varying balances between activity in catalyzing the hydroxyl and water reactions should be possible. For example, in particular, a bridgehead nitrogen should increase its effectiveness in catalyzing the reactions which take place in preparing flexible polyether water-blown foams or other urethane foams.

As a further embodiment, these catalyts are also of value in producing highly resilient cold-molding polyurethane foams, i.e., foams that are cured at room temperature. These foams are generally formed from a conventional urethane reaction between the aforedescribed polyisocyanates and predominantly primary hydroxyl terminated polyether polyols having molecular weights of from about 1000 to 6000.

A particular advantage of isocyanurate foam formulations using the catalysts of this invention to the substantial exclusion of the tertiary amines and tin catalysts normally used in the preparation of rigid polyurethane foams is that such isocyanurate formulations, being nearly neutral and free of metal cations, can be formed in silicone rubber molds without attacking the silicone rubber as occurs with tertiary amine and/or tin catalysts. Since the silicone rubber molds are very expensive because of the high cost of silicone rubber and the large amount of hand labor required in their manufacture, a marked increase in mold life represents a considerable savings in the cost of producing articles such as furniture from such rigid foams.

An additional advantage of quaternary salt catalyzed isocyanurate rigid foam over conventional urethane foam is that demolding time of the isocyanurate foam can be a third or less of that required for urethane foams. The shorter contact of foam and mold not only reduces processing time with consequent savings but again increases mold life.

A further advantage of the isocyanurate foam system is the very low viscosity of the components, which should give better detail in the moldings. Better dimensional stability at higher temperatures, excellent flame resistance and excellent hydrolytic and environmental aging resistance are also possible with our systems.

The following examples further illustrate the subject invention and are not intended to limit the invention, the scope of which is properly delineated in the claims. All quantitative measurements are by weight unless otherwise stated.

EXAMPLE I

To 100 ml. of a 0.675 molar solution of phenyl isocyanate in dioxane (equivalent to 8.04 grams of phenyl isocyanate) there was added 0.00312 gr.-mole (0.07 gram) of tetramethylammonium-2-ethyl hexoate. The solution was permitted to react at 20°C., and the rate of disappearance of free isocyanate was determined by titration of 10 ml. samples of the solution with dibutylamine-hydrochloric acid. After 88 minutes, 94% of the isocyanate had reacted.

The reaction was repeated using bis-tetramethylammonium carbonate in equal molar substitution for the tetramethylammonium-2-ethyl hexoate. After 70 minutes, 88.5% of the isocyanate had reacted.

For comparison the reaction was again repeated using N,N′,N′′-tris(dimethylaminopropyl)sym-hexahydrotiazine (a conventional trimerization catalyst) in equal molar substitution for the bis-tetramethylammonium carbonate. After 240 minutes at 21°C., 92% of the isocyanate had reacted.

The reaction product in each case was isolated, and each product had a melting point of 275°–280°C. Some of each product was dissolved in chloroform for reviewing infrared spectra. Each showed a strong absorption peak at $5.82\mu$ which is characteristic of the isocyanurate carbonyl. Absorption peaks of free isocyanate ($4.4\mu$) and of dimer carbonyl ($5.63\mu$) were either missing or barely detectable in the samples.

EXAMPLE II

To separate portions of 11.9 grams (0.1 gm.-mole) of phenyl isocyanate dissolved in sufficient chlorobenzene to provide a total of 25 ml. of solution at room temperature was added 0.0002 mol of each of the following catalysts (dissolved in ethanol to simplify handling) of this invention:

bis-tetramethylammonium maleate
tetramethylammonium chloroacetate
tetramethylammonium dibutylphosphate After 24 hours at room temperature some of each reaction product was dissolved in chloroform for reviewing the respective infrared spectra. All samples showed strong absorption at $5.82\mu$ whereas absorption at $4.4\mu$ and $5.63\mu$ was either absent or barely detectable.

Similar reaction mixtures were made using compounds that do not agree with the formula $(NR_4)_yA$ as defined hereinbefore in lieu of the compounds of this invention. These compounds, viz., tetramethyl ammonium-p-toluene-sulfonate, polyoxyethylene-oleyl-methyl ammonium chloride, tetramethylammonium-N,N-di-methyl-dithiocarbamate, and potassium-2-ethylhexoate, did not cause trimerization of the phenylisocyanate even after 24 hours.

EXAMPLE III

A rigid polyisocyanurate foam was prepared by adding one gram of 33.3% solution of tetramethylammonium octoate in methanol (diluted with 5 grams of diglyme) to a vigorously stirred mixture of 0.15 gram of a silicone surfactant and 50 grams of diphenylmethane-4,4'-diisocyanate (MDI). A rapid reaction took place at room temperature with the development of a dense rigid foam. The foam was powdered and the residual free isocyanate thereof determined; a value of 0.202 milliequivalent of NCO per gram was found which corresponded to 98% conversion of the isocyanate to trimer.

The experiment was repeated using polymeric MDI in lieu of MDI and a vlue of 0.70 milliequivalent of NCO per gram was found which corresponded to 92% conversion of the isocyanate. Isocyanate determination on the same foam sample after 2 hours post cure at 175°C. gave 0.1 milliequivalent of NCO per gram corresponding to about 99% conversion of all isocyanate present to trimer.

EXAMPLE IV

Samples of rigid isocyanurate foams were prepared from the formulations shown below by intimately mixing the ingredients in the parts shown and pouring them into a tray at room temperature. Visual observation of the cream time, rise time and tack-free time were made and are also listed as well as is the density of each sample.

| INGREDIENTS | SAMPLES | | | |
|---|---|---|---|---|
| | A | B | C | D |
| diphenylmethane 4,4'-diisocyanate | 50 | 50 | 50 | 50 |
| ethylene oxide capped, polyoxypropylene triol 4500 MW | 20 | 20 | 20 | 20 |
| silicone surfactant | 0.5 | 0.5 | 0.5 | 0.5 |
| tetramethyl ammonium carbonate (added as 33% solution in methanol) | 0.17 | 0.17 | 0.17 | 0.17 |
| 2-ethyl-hexanoic acid | — | 0.52 | — | — |
| glacial acetic acid | — | — | 0.52 | 0.12 |
| PROPERTIES | | | | |
| cream time (seconds) | 24 | 18 | 30 | 27 |
| rise time (seconds) | 42 | 48 | 49 | 60 |
| tack-free time (seconds) | 49 | 60 | 180 | 90 |
| density (kg./cu. m.) | 530 | 270 | 160 | 400 |

Addition of the acid to the formulation tends to reduce the foam density by providing additional blowing from the carbon dioxide generated in the salt-forming reaction.

EXAMPLE V

Two polyisocyanurate adhesive formulations as shown below were prepared using the recited compounds in the parts shown. The triol and the epoxy resin were added to improve ductility.

| INGREDIENTS | SAMPLES | |
|---|---|---|
| | E | F |
| diphenyl methane 4,4'-diisocyanate, (PAPI 143L) | 50 | 50 |
| tetramethyl ammonium 2-ethylhexoate, 8.5% in polypropylene ether glycol (2000 MW) | 3.0 | 3.0 |
| ethylene oxide capped polyoxypropylene-ether triol (4500 MW) (Dow CP 4701) | 18 | — |
| diglycidyl ether of polypropylene ether glycol (epoxy equivalent wt. 175 to 205) (Dow DER 733) | — | 20 |

These adhesives were used to adhere 2.54 cm. × 5.08 cm. × .16 cm. test pieces of shot blasted steel and cleaned fiberglass-reinforced cured polyester strip to each other and together; the assemblies were cured at 150°C. for 5 minutes.

The adhesive strengths of the resulting assemblies (in pounds per square inch) were as follows:

| ASSEMBLIES | FORMULATIONS | |
|---|---|---|
| | E | F |
| FRP* to FRP | 160 | 168 |
| FRP to Steel | 125 | 105 |
| Steel to Steel | not tested | 265 |

*glass fiber reinforced thermoset polyester styrene resin

EXAMPLE VI

Five samples of 11.9 grams of phenylisocyanates, each diluted in 13.6 grams of chlorobenzene, were treated with different amounts of tetramethyl ammonium-2-ethyl hexoate (TMAO) and orthotoluene diamine (TDA) as shown below. The times to onset of exotherm and the rates of temperature increase during exotherm were observed in each case and are recorded below.

| SAMPLE | WT. TMAO (gms) | WT. TDA (gms) | MOLE RATIO TDA/ TMAO | TIME OF ONSET OF EXOTHERM (min.) | RATE OF EXOTHERMIC TEMP. INCREASE (°C./min.) |
|---|---|---|---|---|---|
| G | .045 | — | 0:1 | 1.4 | 6.3 |
| H | .045 | .025 | 1:1 | 8.8 | 5.6 |
| J | .045 | .025* | 1:1 | 11.8 | 5.3 |
| K | .045 | .122 | 5:1 | 8.0 | 4.4 |
| L | .090 | .122 | 5:2 | 3.4 | 15.4 |

*meta toluene diamine

Comparing samples G and L it can readily be seen that addition of the aromatic primary polyamine to the novel compounds of this invention inhibits the onset of exotherm or, in other words, retards the beginning of the trimerization reaction without significant effect upon the trimerization reaction (rate of exothermic temperature increase) once it begins.

EXAMPLE VII

Samples of polyisocyanurate, polycarbodiimide, and polyisocyanurate-polycarbodiimide foams were prepared using catalysts of this invention alone and in combination with carbodiimide catalysts as shown below. The ingredients in the parts shown were intimately blended in a beaker and poured into a cardboard dairy container to react and rise into a foam at room temperature. Each foam sample was oven cured at 160°C. for 10 minutes.

| INGREDIENTS | SAMPLES | | | |
| --- | --- | --- | --- | --- |
| | M | N | P | Q |
| diphenylmethane-4,4'-diisocyanate | 25 | 25 | 25 | 25 |
| ethylene oxide capped polyoxypropylene triol (MW 4500) | 10 | 10 | 10 | 10 |
| silicone surfactant | 0.5 | 0.5 | 0.5 | 0.5 |
| tetramethyl ammonium octoate 33% in methanol (trimerization catalyst) | — | — | 0.25 | 0.25 |
| 1-phenyl-3-methyl-3-phospholine-1-oxide (carbodiimide catalyst) | 0.5 | 1.0 | 1.0 | — |
| PROPERTIES | | | | |
| density (kg./cu. m.) | 96 | 32 | 96 | 580 |
| type | flexible | flexible | rigid | rigid |
| friability | low | low | low | high |
| dimensional stability after 6 hrs. at 190°C. | good | good | excellent | excellent |

EXAMPLE VIII

To a stirred mixture of 7.4 grams (0.1 mol) of secondary butanol, 5.7 grams of monochlorobenzene and 0.1 ml. of a catalyst solution of 4.4 grams of tetramethylammonium-2-ethylhexoate in 10 ml. of methanol were added 11.9 grams (0.1 mol) of phenyl isocyanate, and the resulting mixture was allowed to react 30 minutes at room temperature (about 20°C). An infrared spectrum taken on a 3 weight percent solution of the resulting reaction mixture in chloroform showed it to be free of both isocyanate groups and isocyanurate linkages. The spectrum was in agreement with the spectrum for N-phenyl-sec-butyl-urethane.

This test was repeated using half as much sec-butanol and 2.3 grams more chlorobenzene. The infrared spectrum of the resulting reaction mixture indicated about equal parts of N-phenyl-sec-butyl-urethane and triphenylisocyanurate.

EXAMPLE IX

To a stirred solution of 11.9 grams (0.1 mol) in 13.1 grams of chlorobenzene was added 0.1 ml. of a catalyst solution of 4.4 grams of tetramethyl-ammonium-2-ethylhexoate in 10 ml. of ethanol, and the resulting reaction was allowed to proceed with stirring until the maximum exotherm was reached as determined by the use of an iron-constantan thermocouple and commercial electronic recorder. This test was repeated three times substituting for 3.7 grams of the chlorobenzene 3.7 grams (0.05 mol) of n-butanol, sec-butanol and tert-butanol. The respective maximum temperatures and times were as follows:

| Additive | Max. temp. (°C.) | Time (min.) |
| --- | --- | --- |
| control | 120 | 1.5 |
| n-butanol | 127 | 2 |
| sec-butanol | 109 | 6–7 |
| tert-butanol | 97 | 14.5 |

EXAMPLE X

Two foam samples were prepared by intimately blending the following ingredients in the parts shown and allowing the foams to form.

| INGREDIENTS | R | S |
| --- | --- | --- |
| commercial polymeric MDI | 100 | 100 |
| ethylene oxide capped polyoxypropylene triol (MW 4500) | 40 | 40 |
| silicone surfactant | 2.0 | 2.0 |
| tetramethyl-ammonium octoate 33% in methanol | 2.5 | 2.5 |
| tert-butanol | — | 6.0 |
| PROPERTIES | | |
| cream time (sec.) | 23 | 42 |
| rise time (sec.) | 31 | 53 |
| tack free time (sec.) | 35 | 57 |
| density (kg./cu. m.) | 270 | 115 |

By adjusting the concentrations of secondary or tertiary hydroxyl and catalyst level, a foaming profile, i.e., the relationship between cream time, rise time and cure time, can be adjusted within wide limits. This processing control is very desirable in making isocyanurate solids and foams.

We claim:
1. A method which comprises reacting organic isocyanates in contact with at least 0.01 part by weight of said isocyanates of a compound displaying catalytic activity for exothermic cyclic trimerization of organic isocyanates and for urethane formation, said compound corresponding to the structural formula $(NR_4)_y A$ in which
   A is an anion derived from an acid having a pK value, in aqueous solution at substantially room temperature, of 2.0 or greater and being free of substituents which can react with isocyanates under conditions of trimerization and being selected from the group consisting of inorganic oxygen acids, carboxylic acids and carbonic acid,
   each R is any organic group other than A and free of any substituents and functional groups which can react with isocyanates under conditions of trimerization, no more than one R per N containing an aromatic ring attached directly to N, and
   y is a whole number equal in value to the valence of A.
2. A method in accordance with claim 1 wherein each R is a hydrocarbon group containing no more than about 18 carbon atoms, the total number of the carbon atoms of the four R groups on any N being no more than about 25.
3. A method in accordance with claim 2 wherein each R is a hydrocarbon group containing no more than about 8 carbon atoms, the total number of the carbon atoms of the four R groups on any N being no more than about 12.

4. A method in accordance with claim 2 wherein the acid from which A is derived has a pK value in aqueous solution at essentially room temperature of from about 4 to about 10.

5. A method in accordance with claim 1 wherein said organic isocyanates are polyisocyanates and said reaction takes place in contact with from 20 to 60 parts by weight per 100 parts by weight of said isocyanates of hydroxylated ingredients selected from the group consisting of aliphatic polyethers, aliphatic polyesters and polyepoxides, said hydroxylated ingredients having a number average molecular weight from about 250 to 12,000.

6. A method in accordance with claim 1 wherein said reaction takes place in contact with alcohols and/or polyols containing secondary and/or tertiary alcohol groups, the ratio of the total secondary and tertiary hydroxyl groups introduced into the system to the total isocyanate groups introduced into the system being from about 0.01 to 0.25 -OH group per -NCO group where the compound is a monoalcohol and from about 0.01 to 0.50 -OH group per -NCO group where the compound is a polyol having 2 or more -OH groups.

7. A method in accordance with claim 5 wherein said reaction takes place in contact with from 0.5 to 5 parts by weight of water per 100 parts of organic isocyanates.

8. A method in accordance with claim 5 wherein said reaction takes place in contact with from 2 to 4 parts by weight of a carbodiimide-forming catalyst per 100 parts by weight of organic isocyanates, the amounts of said carbodiimide-forming catalyst and said trimerization catalyst being such that the weight of said carbodiimide-forming catalyst is from 1 to 3 times the weight of said trimerization catalyst.

* * * * *